(12) United States Patent
Chang

(10) Patent No.: US 9,048,709 B2
(45) Date of Patent: Jun. 2, 2015

(54) MOTOR HEAT DISSIPATION STRUCTURE WITH INBUILT ELECTRONIC BOARD

(71) Applicant: AIDEA COMPANY, Taichung (TW)

(72) Inventor: Da-Yi Chang, Taichung (TW)

(73) Assignee: AIDEA COMPANY, Taichung (TW)

( * ) Notice: Subject to any disclaimer, the term of this patent is extended or adjusted under 35 U.S.C. 154(b) by 249 days.

(21) Appl. No.: 13/912,645

(22) Filed: Jun. 7, 2013

(65) Prior Publication Data

US 2014/0361647 A1    Dec. 11, 2014

(51) Int. Cl.
*H02K 1/32* (2006.01)
*H02K 9/22* (2006.01)
*H02K 11/00* (2006.01)

(52) U.S. Cl.
CPC .............. *H02K 9/22* (2013.01); *H02K 11/0073* (2013.01)

(58) Field of Classification Search
CPC .................................. H02K 9/22; H02K 3/24
USPC ........ 310/52, 54, 58, 64, 89, 67 R, 68 R, 68 D
See application file for complete search history.

(56) References Cited

U.S. PATENT DOCUMENTS

| | | | | |
|---|---|---|---|---|
| 5,939,807 | A * | 8/1999 | Patyk et al. | 310/89 |
| 6,169,345 | B1 * | 1/2001 | Bloch et al. | 310/67 R |
| 2008/0048535 | A1 * | 2/2008 | Bi et al. | 310/68 R |

* cited by examiner

*Primary Examiner* — Hanh Nguyen
(74) *Attorney, Agent, or Firm* — Ming Chow; Sinorica, LLC

(57) ABSTRACT

A motor heat dissipation structure with an inbuilt electronic board includes a motor casing made of an aluminum material. The electronic board is disposed in the motor casing. Electronic components provided on one side of the electronic board are attached to the inner wall of one end of the motor casing. A heat dissipation metallic member is provided on electronic components on the other side of the electronic board. The heat dissipation metallic member extends to the circumferential side of the motor casing and is attached to the motor casing. Thus, the heat generated from the electronic components is conducted to the outside through the motor casing to enhance heat dissipation efficiency of the electronic board so as to protect the electronic board, preventing the electronic board from being overheated.

6 Claims, 6 Drawing Sheets

MOTOR HEAT DISSIPATION STRUCTURE WITH INBUILT ELECTRONIC BOARD

BACKGROUND OF THE INVENTION

1. Field of the Invention

The present invention relates to a motor heat dissipation structure with an inbuilt electronic board.

2. Description of the Prior Art

A conventional DC brushless motor controls rotation of the motor electronically. Therefore, the motor must be provided with an electronic board to control the DC brushless motor. In order to decrease the entire size of the DC brushless motor for assembly, the electronic board is usually disposed in the casing of the DC brushless motor.

FIG. 1 is an exploded view of a conventional motor. FIG. 2 is a partial enlarged sectional view of the conventional motor. The motor comprises a casing 1. An electronic board 2, a stator 3 and a rotor 4 are provided in the casing 1 in sequence. For convenient assembly and operation of the conventional motor, the entire size of the motor must be reduced so the inside space of the motor is limited. Thus, it is unable to mount heat dissipation fins or a heat dissipation fan on the electronic board 2 in the motor.

However, during use of the motor, a large number of heat is generated accompanying consumption of the current. The heat cannot be expelled in a short time to result in that the electronic components of the motor are overheated. This may influence the efficiency and service life of the electronic board 2. The electronic board 2 may be damaged to cause malfunction of the motor.

Accordingly, the inventor of the present invention has devoted himself based on his many years of practical experiences to solve these problems.

SUMMARY OF THE INVENTION

The primary object of the present invention is to provide a motor heat dissipation structure with an inbuilt electronic board to better the heat dissipation so as to enhance the heat dissipation efficacy of the electronic board, preventing the motor from being overheated in order to protect the motor.

In order to achieve the aforesaid object, the motor heat dissipation structure with an inbuilt electronic board comprises a motor casing made of a metallic material having high heat dissipation effect. The electronic board is disposed in the motor casing. Two opposing sides of the electronic board are respectively provided with a plurality of electronic components. The electronic components on one side of the electronic board are direct attached to the inner wall of one end of the motor casing. A heat dissipation metallic member is provided on the electronic components on the other side of the electronic board. The heat dissipation metallic member extends to the inner wall of the circumferential side of the motor casing and is attached to the inner wall of the circumferential side of the motor casing.

Be getting contact with the aluminum motor casing, the heat generated from the electronic components is conducted to the outside through the motor casing to better the heat dissipation effect of the electronic board so as to enhance the heat dissipation efficacy of the electronic board, preventing the electronic board from being overheated.

DETAILED DESCRIPTION OF THE PREFERRED EMBODIMENTS

Embodiments of the present invention will now be described, by way of example only, with reference to the accompanying drawings.

Figure 1:
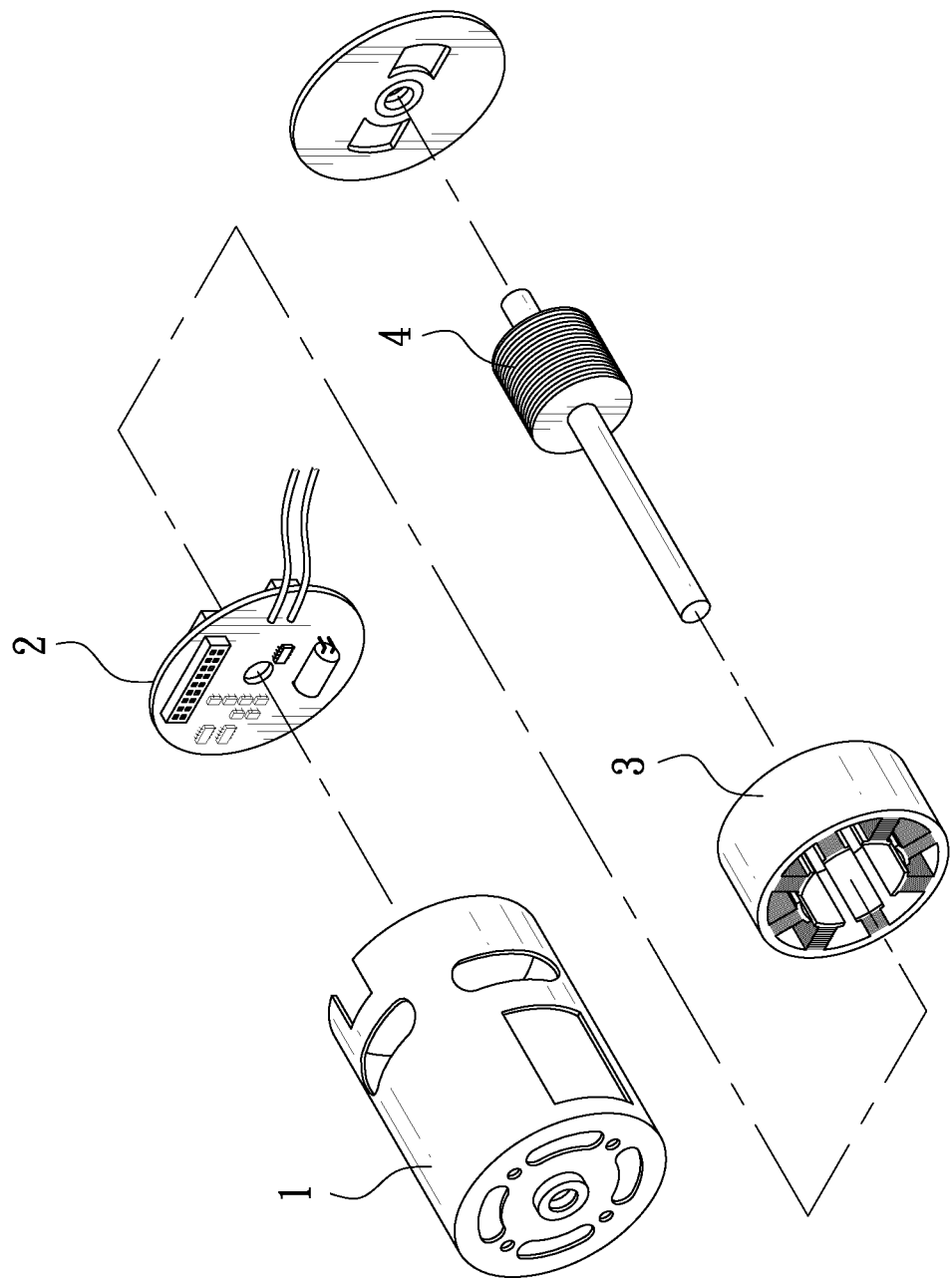
FIG. 1 is an exploded view of a conventional motor.
Figure 2:
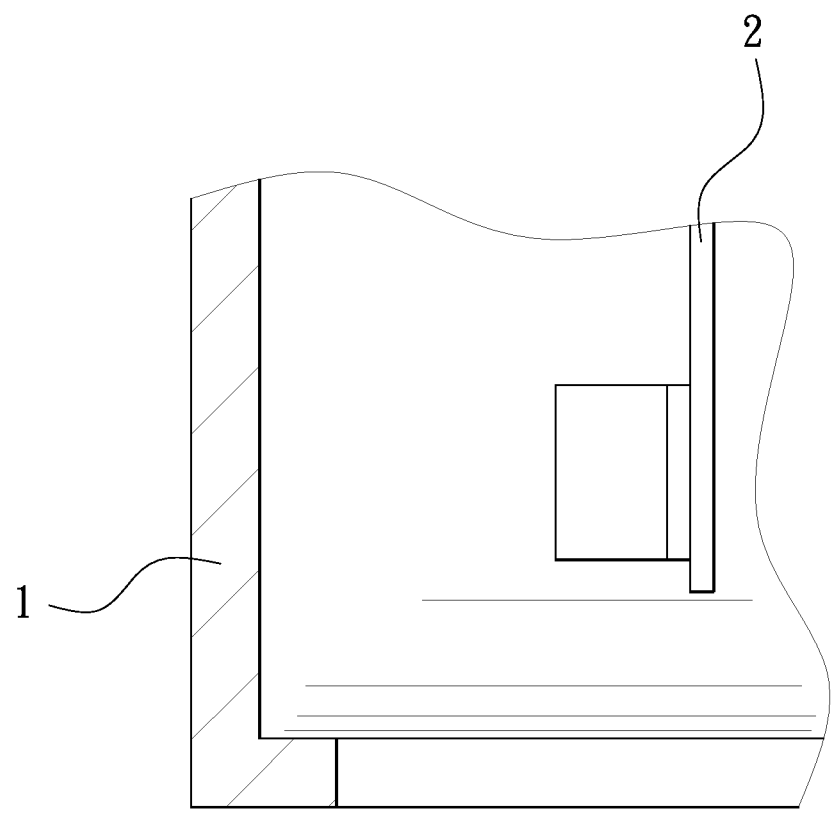
FIG. 2 is a partial enlarged sectional view of the conventional motor.
Figure 3:
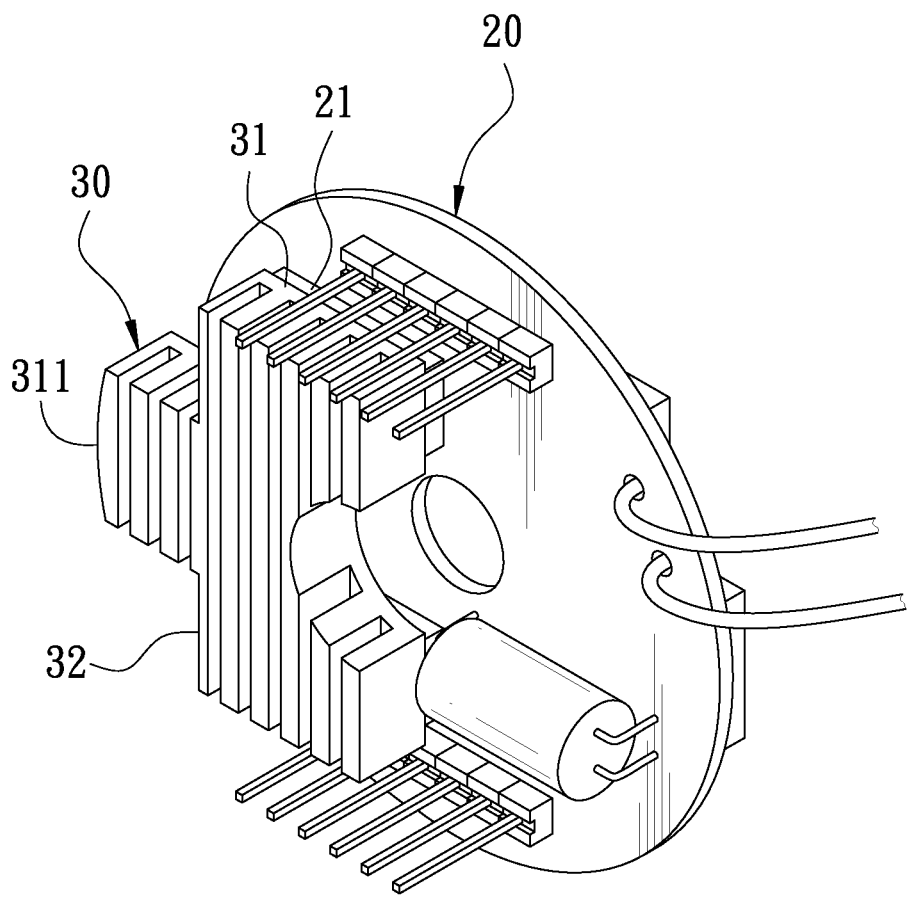
FIG. 3 is a perspective view of the electronic board of the present invention.
Figure 4:
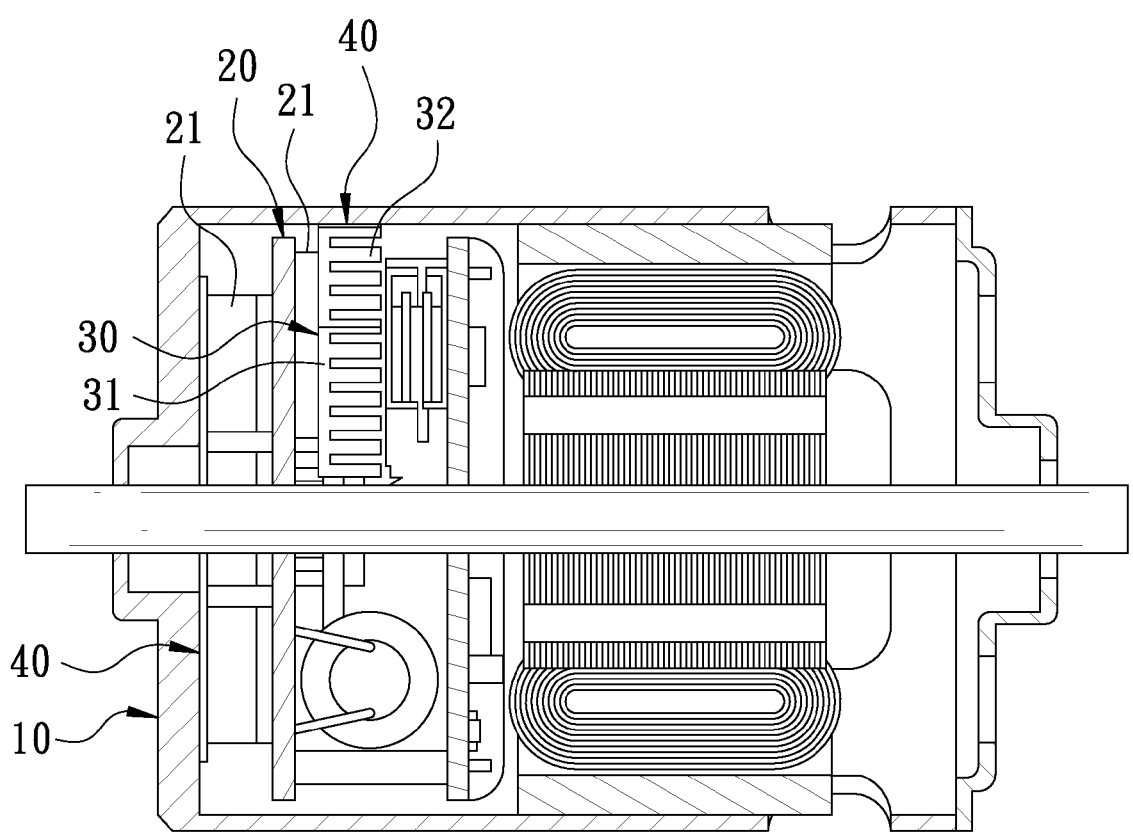
FIG. 4 is a sectional view of the electronic board of the present invention.

FIG. 3 is a perspective view of the electronic board of the present invention. FIG. 4 is a sectional view of the electronic board of the present invention. The present invention discloses a motor heat dissipation structure with an inbuilt electronic board. The motor heat dissipation structure with the inbuilt electronic board comprises a motor casing 10, an electronic board 20, a heat dissipation metallic member 30 and heat dissipation glue 40.

The motor casing 10 is made of an aluminum material having high heat dissipation effect so that the motor casing 10 has good heat conductivity to conduct the heat to the outside quickly.

The electronic board 20 is disposed in the motor casing 10 along a radial direction of the motor casing 10. Two opposing sides of the electronic board 20 are respectively provided with a plurality of electronic components 21. The electronic components 21 on one side of the electronic board 20 are direct attached to the inner wall of one end of the motor casing 10, such that the heat generated from the electronic components 21 can be conducted to the motor casing 10 to better the heat dissipation effect of the electronic board 20 so as to enhance the heat dissipation efficacy of the electronic board 20.

The heat dissipation metallic member 30 is disposed on the electronic components 21 on the other side of the electronic board 20. The heat dissipation metallic member 30 extends to the inner wall of the circumferential side of the motor casing 10, and has a curved portion 311 corresponding to the inner wall of the circumferential side of the motor casing 10 for the inner wall of the circumferential side of the motor casing 10 to attach thereon, such that the heat generated from the electronic components 21 can be conducted to the motor casing 10 to better the heat dissipation effect of the electronic board 20 so as to enhance the heat dissipation efficacy of the electronic board 20. The heat dissipation metallic member 30 comprises a base 31 made of an aluminum material. The base 31 is provided with a plurality of vertical heat dissipation fins 32 to conduct the heat of the electronic board 20 to the outside so as to enhance the heat dissipation efficiency of the electronic board 20.

The heat dissipation glue 40 is disposed between the electronic components 21 and the motor casing 10 as well as between the heat dissipation metallic member 30 and the motor casing 10 for seamless tight contact between the electronic components 21 and the motor casing 10 as well as between the heat dissipation metallic member 30 and the motor casing 10, such that the heat of the electronic board 20 can be conducted to the motor casing 10 to enhance the heat dissipation efficacy.

Figure 5:
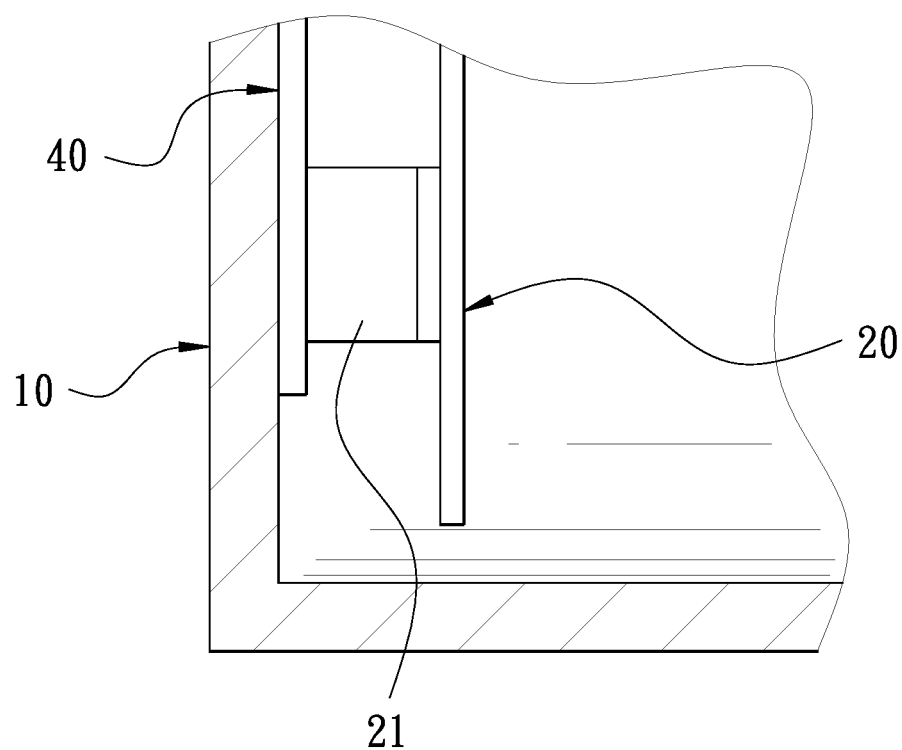
FIG. 5 is a partial enlarged sectional view of the electronic board of the present invention.

FIG. 5 is a partial enlarged sectional view of the electronic board of the present invention. The electronic components 21 are direct fully attached to the motor casing 10 by using the heat dissipation glue 40. By the aluminum casing of the motor casing 10, the heat generated from the electronic components 21 are conducted to the outside through the motor casing 10 to better the heat dissipation effect of the electronic board 20 so as to solve the overheated problem of the electronic board of the conventional motor and to protect the electronic board.

Figure 6:
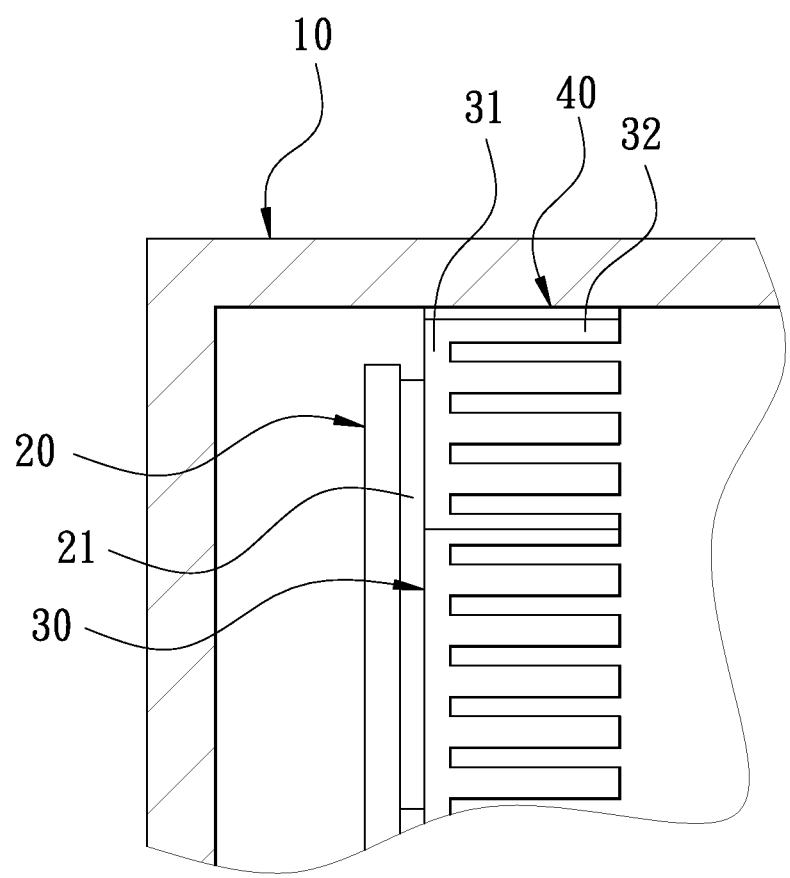
FIG. 6 is another partial enlarged sectional view of the electronic board of the present invention.

FIG. 6 is another partial enlarged sectional view of the electronic board of the present invention. The other side of the electronic board 20, no attached to the motor casing 10, is provided with the heat dissipation metallic member 30. The heat dissipation metallic member 30 extends to the inner wall of the circumferential side of the motor casing 10, and is attached to the inner wall of the circumferential side of the motor casing 10 by using the heat dissipation glue 40, such that the heat generated from the electronic components 21 can be conducted to the outside through the motor casing 10 to better the heat dissipation effect of the electronic board 20 so as to enhance the heat dissipation efficacy of the electronic board 20.

It is noted that the heat dissipation metallic member 30 is attached to the inner wall of the circumferential side of the motor casing 10 through the curved portion 311, such that the heat generated from the electronic components 21 can be conducted to the motor casing 10 to better the heat dissipation effect of the electronic board 20 so as to enhance the heat dissipation efficacy of the electronic board 20.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A motor heat dissipation structure with an inbuilt electronic board, comprising:
   a motor casing made of a metallic material;
   the electronic board being disposed in the motor casing along a radial direction of the motor casing, two opposing sides of the electronic board being respectively provided with a plurality of electronic components, the electronic components on one side of the electronic board being direct attached to an inner wall of one end of the motor casing;
   a heat dissipation metallic member disposed on the electronic components on the other side of the electronic board, the heat dissipation metallic member extending to an inner wall of a circumferential side of the motor casing and being attached to the inner wall of the circumferential side of the motor casing;
   thereby, heat generated from the electronic components being conducted to outside through the motor casing.

2. The motor heat dissipation structure with an inbuilt electronic board as claimed in claim 1, wherein the heat dissipation metallic member has a curved portion corresponding to the inner wall of the circumferential side of the motor casing for the inner wall of the circumferential side of the motor casing to attach thereon.

3. The motor heat dissipation structure with an inbuilt electronic board as claimed in claim 1, wherein the heat dissipation metallic member comprises a base, and the base is provided with a plurality of vertical heat dissipation fins.

4. The motor heat dissipation structure with an inbuilt electronic board as claimed in claim 1, wherein heat dissipation glue is provided between the electronic components and the motor casing.

5. The motor heat dissipation structure with an inbuilt electronic board as claimed in claim 1, wherein heat dissipation glue is provided between the heat dissipation metallic member and the motor casing.

6. The motor heat dissipation structure with an inbuilt electronic board as claimed in claim 1, wherein the motor casing and the heat dissipation metallic member are made of an aluminum material.

* * * * *